US011530290B2

(12) United States Patent
Hocke et al.

(10) Patent No.: US 11,530,290 B2
(45) Date of Patent: Dec. 20, 2022

(54) METHOD FOR PRODUCING A POLYISOCYANURATE COMPOSITE MATERIAL

(71) Applicant: Covestro Deutschland AG, Leverkusen (DE)

(72) Inventors: Heiko Hocke, Shanghai (CN); Mathias Matner, Neuss (DE); Dirk Achten, Leverkusen (DE); Paul Heinz, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/098,006

(22) PCT Filed: May 3, 2017

(86) PCT No.: PCT/EP2017/060576
§ 371 (c)(1),
(2) Date: Oct. 31, 2018

(87) PCT Pub. No.: WO2017/191216
PCT Pub. Date: Nov. 9, 2017

(65) Prior Publication Data
US 2019/0144593 A1    May 16, 2019

(30) Foreign Application Priority Data

May 4, 2016   (EP) ..................... 16168334

(51) Int. Cl.
| | |
|---|---|
| C08L 75/00 | (2006.01) |
| C08G 18/09 | (2006.01) |
| C08J 5/04 | (2006.01) |
| C08G 18/48 | (2006.01) |
| C08G 18/02 | (2006.01) |
| C08G 18/72 | (2006.01) |
| C08G 18/79 | (2006.01) |
| C08G 18/73 | (2006.01) |
| C08G 18/22 | (2006.01) |
| B32B 27/28 | (2006.01) |

(52) U.S. Cl.
CPC ......... *C08G 18/092* (2013.01); *C08G 18/022* (2013.01); *C08G 18/225* (2013.01); *C08G 18/4825* (2013.01); *C08G 18/725* (2013.01); *C08G 18/73* (2013.01); *C08G 18/792* (2013.01); *C08J 5/043* (2013.01); *C08G 2115/02* (2021.01); *C08J 2375/04* (2013.01)

(58) Field of Classification Search
None
See application file for complete search history.

(56) References Cited

U.S. PATENT DOCUMENTS

| | | | |
|---|---|---|---|
| 3,211,703 | A | 10/1965 | Gilman et al. |
| 3,330,828 | A | 7/1967 | Grogler et al. |
| 3,996,223 | A | 12/1976 | Gupta et al. |
| 4,255,569 | A | 3/1981 | Müller et al. |
| 4,379,905 | A | 4/1983 | Stemmler et al. |
| 4,604,418 | A | 8/1986 | Shindo et al. |
| 4,837,359 | A | 6/1989 | Woynar et al. |
| 4,960,848 | A | 10/1990 | Scholl et al. |
| 4,994,541 | A | 2/1991 | Dell et al. |
| 5,064,960 | A | 11/1991 | Pedain et al. |
| 5,076,958 | A | 12/1991 | Pedain et al. |
| 5,208,269 | A | 5/1993 | Brown |
| 5,502,147 | A * | 3/1996 | Nodelman ......... C08G 18/6505 528/49 |
| 5,914,383 | A | 6/1999 | Richter et al. |
| 6,133,397 | A | 10/2000 | O'Connor et al. |
| 2005/0163969 | A1 | 7/2005 | Brown |
| 2009/0005517 | A1 | 1/2009 | Bleys et al. |

(Continued)

FOREIGN PATENT DOCUMENTS

| | | |
|---|---|---|
| DE | 1954093 A1 | 6/1970 |
| DE | 1670666 A1 | 7/1971 |

(Continued)

OTHER PUBLICATIONS

Product data sheet for Desmodur® 44V20L, provided by Covestro. (Year: 2014).*
Product data sheet for Desmodur® N 3600, provided by Covestro. (Year: 2018).*
International Search Report for PCT/EP2017/060576 dated Jul. 20, 2017.
Written Opinion of the International Searching Authority for PCT/EP2017/060506 dated Jul. 19, 2017.
Written Opinion of the International Searching Authority for PCT/EP2017/060576 dated Jul. 20, 2017.

(Continued)

*Primary Examiner* — Michael J Feely
(74) *Attorney, Agent, or Firm* — The Webb Law Firm

(57) ABSTRACT

The invention relates to a process for producing a composite polyisocyanurate material, comprising the following steps: a) providing a polyisocyanate composition A) which comprises oligomeric polyisocyanates and is low in monomeric diisocyanates, "low in monomeric diisocyanates" meaning that the polyisocyanate composition A) has a content of monomeric diisocyanates of not more than 20% by weight, and b) catalytically trimerizing the polyisocyanate composition A) in the presence of at least one fibrous filler B) and of a trimerization catalyst C) to give the composite polyisocyanurate material, where the trimerization catalyst C) comprises at least one metal salt and/or quaternary ammonium salt. The invention further relates to composite polyisocyanurate materials obtainable by the process according to the invention and to the use thereof for production of a component, and to components consisting of or comprising a composite polyisocyanurate material according to the invention.

17 Claims, No Drawings

(56) References Cited

U.S. PATENT DOCUMENTS

| | | | |
|---|---|---|---|
| 2013/0245164 A1* | 9/2013 | Limerkens | C08G 18/16 524/72 |
| 2017/0044296 A1 | 2/2017 | Harada | |
| 2017/0152354 A1 | 6/2017 | Lindner et al. | |
| 2019/0144592 A1* | 5/2019 | Hocke | C08G 18/792 528/52 |

FOREIGN PATENT DOCUMENTS

| | | | |
|---|---|---|---|
| DE | 2414413 A1 | 10/1975 |
| DE | 2452532 A1 | 5/1976 |
| DE | 2641380 A1 | 3/1978 |
| DE | 3100263 A1 | 8/1982 |
| DE | 3219608 A1 | 9/1983 |
| DE | 3700209 A1 | 7/1988 |
| DE | 3900053 A1 | 7/1990 |
| DE | 3928503 A1 | 3/1991 |
| DE | 19505046 A1 | 8/1996 |
| EP | 0056159 B1 | 2/1986 |
| EP | 0336205 A2 | 10/1989 |
| EP | 0339396 A1 | 11/1989 |
| EP | 0798299 A1 | 10/1997 |
| EP | 2881413 A1 | 6/2015 |
| GB | 952931 A | 3/1964 |
| GB | 966338 A | 8/1964 |
| GB | 1145952 A | 3/1969 |
| GB | 1244416 A | 9/1971 |
| GB | 1335958 A | 10/1973 |
| JP | 2001-098042 A | 4/2001 |
| WO | WO-2015166983 A1 | 11/2015 |
| WO | WO-2015197739 A1 | 12/2015 |

OTHER PUBLICATIONS

International Preliminary Report on Patentability received for PCT Patent Application No. PCT/EP2017/060576, dated Nov. 15, 2018, 17 pages (9 pages of English Translation and 8 pages of Original Document).

* cited by examiner

METHOD FOR PRODUCING A POLYISOCYANURATE COMPOSITE MATERIAL

CROSS-REFERENCE TO RELATED APPLICATIONS

This application is a national stage application (under 35 U.S.C. § 371) of PCT/EP2017/060576, filed May 3, 2017, which claims benefit of European Application No. 16168334.7, filed May 4, 2016, both of which are incorporated herein by reference in their entirety.

The present invention relates to a process for producing composite polyisocyanurate materials, to the composite polyisocyanurate materials obtainable therefrom, and also to the use of composite polyisocyanurate materials of this kind for production of components and to components consisting of or comprising a composite polyisocyanurate material according to the invention.

Fibre-reinforced composite materials consisting of a polymeric matrix and a fibrous filler find use predominantly as a lightweight construction material, for example in motor vehicle construction, shipbuilding, aircraft construction, the sports sector, the construction industry, the oil industry, and the electrical and energy sector. While the polymer matrix fixes the fibrous filler, ensures the transfer of load and protects the fibrous filler from environmental influences, the task of the fibrous filler is, for example, to guide the load along the fibre.

By means of suitable combination of polymeric matrix and fibrous filler, it is possible to obtain fibre-reinforced composite materials having improved mechanical and physical properties compared to the polymeric matrix alone.

Typically, polymeric matrix materials used for fibre-reinforced composite materials are unsaturated polyester (UP) and polyvinyl (VP) resins, epoxides and, as of recently, also aromatic polyurethane (PU) systems. These known polymeric matrix materials have the disadvantage of inadequate weathering resistance in the composite material, and therefore typically have to be painted with weathering-resistant paint when used outdoors. Such a painting operation is associated with considerable complexity in some cases, since the weathering-resistant paint layer often adheres only poorly on the surface of the fibre-reinforced composite material, especially when separating agents have been used in the production of the component. The Provision of composite materials with good weathering resistance is therefore desirable.

Polymers with polyisocyanurate structure components are basically known for their good thermal stability and chemical resistance. Particularly polyurethane paints with polyisocyanurate contents based on aliphatic isocyanates additionally have very good weathering resistance. However, the complete trimerization of diisocyanates to give polyisocyanurate plastics is difficult to monitor. For this reason, aliphatic polyisocyanurates have to date typically only found practical use as crosslinking agents for polyurethane systems in paint and adhesive chemistry, the production of which involves stopping the trimerization reaction at low conversions and removing excess unreacted monomeric diisocyanate. Thus, DE 31 00 263; GB 952 931, GB 966 338; U.S. Pat. Nos. 3,211,703, 3,330,828, EP 0 056 159 B1 and DE 32 19 608 A1 envisage conducting the reaction either in dilution or only up to low conversion values with very precise temperature control in the production of crosslinking agents based on polyisocyanurates proceeding from aliphatic and mixed aliphatic and aromatic monomeric diisocyanates. There is specifically no formation here of fully crosslinked polyisocyanurate plastics, only formation of oligomeric, soluble products of low viscosity.

In addition, there have also been attempts to synthesize fully crosslinked polyisocyanurate plastics based on aliphatic weathering-resistant isocyanates.

For example, *European Polymer Journal, vol.* 16, 147-148 (1980) describes the very slow catalytic trimerization of monomeric 1,6-diisocyanatohexane (HDI) at low temperatures of 40° C. to give a clear transparent polyisocyanurate plastic. For this purpose, however, very high catalyst concentrations of dibutyltin dimethoxide (about 10% by weight) as trimerization catalyst are required, and these have a severe adverse effect on the thermal stability and colour stability of the products. The glass transition temperature ($T_g$) and the thermal heat resistance were not examined. The content of free isocyanate groups within the solid material was not determined. Only the tensile shear strength at room temperature was determined, and showed relatively low values. Other diisocyanates such as IPDI, TDI or MDI did not give solids. Moreover, the long reaction time required is uneconomic and therefore unsuitable for many processing operations.

*European Polymer Journal, Vol.* 16, 831-833 (1980) describes the trimerization of monomeric HDI to give a polyisocyanurate at a temperature of 140° C. using 6% by weight of tributyltin oxide as an extremely sluggish catalyst. However, the exact conversion of the NCO groups and the properties of this solid material are not described any further.

The thesis by Theo Flipsen: *"Design, synthesis and properties of new materials based on densely crosslinked polymers for polymer optical fiber and amplifier applications", Rijksuniversiteit Groningen,* 2000 describes the trimerization of monomeric HDI with a neodymium/crown ether complex as catalyst. The polyisocyanurate obtained, which is said to have good optical, thermal and mechanical properties, was studied in the context of the thesis for its suitability for optical applications, especially as polymeric optical fibres. According to Flipsen, only under ideal conditions with a soluble neodymium-crown ether catalyst and a preliminary reaction at 60° C. or room temperature and further reaction at temperatures of up to 140° C. are high-transparency polyisocyanurates having a glass transition temperature ($T_g$) of 140° C. obtained over a long period of greater than 24 h. A disadvantage of the process described is that it is a slow multistage process with a complicated reaction regime with problematic implementation on the industrial scale. Moreover, the neodymium/crown ether complex used as catalyst is very costly and therefore uneconomic for use in an industrial scale process. It is also known from the studies of Theo Flipsen that monomeric HDI is always present over the entire trimerization reaction. It is therefore not possible to entirely rule out the presence of small free fractions of monomeric HDI even in the finished composite polyisocyanurate material that migrate to the surface over time and get into the human body via contact or evaporation. It is therefore desirable for safe handling of the finished composite polyisocyanurate material components that no monomers are released from the finished polyisocyanurate plastic or, better, no monomers at all are used for production thereof.

GB 1 335 958 describes the production of a composite polyisocyanurate material by impregnating glass fibre weave with a 2:1 mixture of methylene diphenyl isocyanate (MDI) and trimethylhexamethylenediamine (TMHDI) in the presence of a benzyldimethylamine/phenyl glycidyl ether mixture as catalyst. The polyisocyanurate plastic is cured by means of a complicated temperature regime over a long period of 16 h at 50° C., 1 h at 100° C., 1 h at 150° C. and 3 h at 180° C. The process described takes a very long time and is difficult to implement on the industrial scale because of the complicated reaction regime.

*European Polymer Journal*, Vol. 14, 675-678 (1978) describes the production both of HDI-based polyisocyanurate plastics and of composite polyisocyanurate materials. These exhibited similar or better properties compared to composite polyester or epoxide materials. However, this process regime, with the long reaction times of more than 24 hours that are required at an optimal catalyst concentration of about 0.5% by weight of bis(tributyltin) oxide, is industrially uneconomic and therefore impracticable.

WO 2015/166983 describes the use of isocyanurate plastics for the production of potting compounds for LEDs. The production process is based on the polymerization of oligomeric polyisocyanates. Only small solids are produced. The use of polyethers for activation of a catalyst is not disclosed.

U.S. Pat. No. 6,133,397 describes coatings, but not solids, that are formed from polyisocyanurates and are obtained by polymerization of oligomeric polyisocyanates.

In patent application US 2009/005517 A1 Bleys et al. describe the production of composite polyisocyanurate materials. However, exclusively examples based on aromatic polyisocyanates are cited here. But these are known to exhibit poor weathering characteristics. There was no mention of analytical results relating to the composite aromatic polyisocyanurate materials produced. It is also apparent from the table of Example 5 that polyethylene glycols (EO polyethers) in the catalyst system, in the case of use of pure aromatic polyisocyanates, lead to very short pot lives (well below 800 seconds) which make practical implementation difficult or impossible. No studies or theoretical discussion relating to aliphatic polyisocyanates and the possible differences thereof from aromatic isocyanates have been implemented. The advantages of the use of aliphatic polyisocyanates for prolonging pot life and improving the weathering properties, or even the combination of polyethylene glycols (EO polyethers) with alkaline metal salts and aliphatic polyisocyanates, have not been mentioned or described.

The preparation of polyisocyanurate plastics is described in the prior art mainly proceeding from liquid monomeric diisocyanates (e.g. stearyl diisocyanate, dodecyl diisocyanate, decyl diisocyanate, nonyl diisocyanate, octyl diisocyanate, HDI, BDI, PDI, IPDI, H12MDI, TDI, MDI, NDI, NBDI), of aliphatic and aromatic nature alike. The exothermicity of the trimerization reaction to give polyisocyanurates is so high (−75 kJ/mol of NCO) that a reaction proceeding from monomeric polyisocyanates cannot be conducted in a practicable manner, particularly in the case of inexpensive monomeric polyisocyanates with a high isocyanate content (e.g. butane 1,4-diisocyanate (BDI), pentamethylene 1,5-diisocyanate (PDI), hexamethylene 1,6-diisocyanate (HDI), triisocyanatononane (TIN)). This is especially true with regard to the large scale required for industrial applications and adiabatic conditions as typically occur within solids in the case of highly exothermic polymerization processes. In the prior art, the trimerization has therefore been effected to date only in small amounts of substance with strict temperature monitoring.

An adiabatic change of state is a thermodynamic operation in which a system is converted from one state to another without exchanging thermal energy with its environment. "Adiabatic conditions" is understood to mean here that complete dissipation of the heat of reaction released in the exothermic reaction to the environment is not possible. It is thus typically impossible to achieve homogeneous conditions in solids, and "adiabatic" conditions that exist particularly within the solids in the case of fast reactions can lead to a locally significant increase in temperature in the case of an exothermic reaction. These local hotspots are extremely critical where the production of functionally homogeneous products is concerned.

A further problem is that aromatic monomeric diisocyanates and many arylaromatic or alicyclic monomeric diisocyanates can be homo- and co-trimerized only to low conversions. It is often necessary to add plasticizing or co-dissolving coreactants. Otherwise, the reaction freezes at high residual isocyanate contents and typically opaque and discoloured products are obtained. The use of plasticizing and co-dissolving co-reactants is disadvantageous in turn since these lead to less chemically and thermally inert structural elements such as allophanates, ureas, urethanes, thiourethanes and oxazolidinones, polyesters, polyethers, and at high temperatures to uretdiones with subsequent carbodiimidation and carbon dioxide elimination, and to asymmetric isocyanurates. The production of polyisocyanurate plastics having substantially or exclusively isocyanurate structures as structural element is therefore not possible.

Temperature monitoring, especially even in every smallest volume element of the shaped body, in the production of highly converted polyisocyanurate plastics is of enormous significance since, because of the high isocyanate contents of the monomeric starting materials under adiabatic conditions as typically prevail in trimerizations in solids, because of the exothermic reaction, temperatures locally exceeding 300° C., i.e., for example, above the flashpoint of monomeric HDI at 140° C. and the boiling point of monomeric HDI of 255° C. and even up to the self-ignition temperature of HDI of 454° C., can arise. Thus, the high temperatures can lead to direct breakdown of the products or even to in situ evaporation and self-ignition of the monomeric polyisocyanates.

As well as the detriments to occupational hygiene resulting from the monomeric diisocyanates or breakdown products released, the formation of blisters at relatively high temperatures is troublesome here. Blisters are formed, for example, as a result of side reactions through uretdione formation and subsequent carbodiimidization with elimination of carbon dioxide. The solid polyisocyanurate plastic bodies produced proceeding from the monomeric diisocyanates therefore typically have blisters, are dark in colour and hence cannot satisfy particular requirements with regard to appearance, density, electrical insulation characteristics and mechanical properties.

A feature common to the aforementioned processes is that the trimerization is started at low temperatures. Higher trimerization temperatures, particularly at the start of the trimerization, can be controlled only with difficulty proceeding from monomeric polyisocyanates, and lead to considerable side reactions in the form of uretdiones and carbodiimides, and are thus the cause of blister formation as a result of carbon dioxide elimination and discolouration of the product obtained. The sole exception is trimerization in the presence of high concentrations of extremely sluggish catalysts, for example tributyltin oxide. The preliminary reactions thus conducted, which typically take several hours, to give low isocyanate conversions of about 50% at temperatures above 100° C. are too costly and inconvenient for production of composite polyisocyanurate materials and are therefore of no interest on the industrial scale.

A further feature common to the processes described is that they are incapable of giving highly converted composite polyisocyanurate materials in efficient industrial processes particularly under adiabatic conditions that typically occur within solids in the case of highly exothermic reactions, especially those that are substantially free of troublesome defects in the form of discolouration, inhomogeneity and unwanted blisters, and have good weathering resistance and good mechanical properties such as a high glass transition temperature (Tg) and high tensile strengths. Nor is it possible by the processes known from the prior art to effect polymerization at elevated temperatures in open reaction vessels without risking significant release of monomeric diisocyanates into the environment. By contrast, industrially efficient processes feature high conversion rates and high process safety in terms of occupational hygiene, and also reproducibility.

Because of the difficulty in controlling the trimerization of the monomeric isocyanates to give polyisocyanurate plastics, the practical use thereof as polymeric matrix material in composite materials, in spite of their excellent weathering resistance, has been of no significance on the industrial scale to date, To the extent that fibre-reinforced composite polyisocyanurate materials are known at all from the prior art, they seem to be in need of improvement with regard to the production conditions for the polyisocyanurate matrix material, such as reaction time and control.

It was thus an object of the invention to provide a practically readily implementable, efficient industrial process for production of weathering-resistant fibre-reinforced composite polyisocyanurate materials, which especially features short reaction times and a simple reaction regime. The fibre-reinforced composite polyisocyanurate materials obtained should also be substantially free of troublesome defects in the form of discolouration, inhomogeneity and unwanted blisters.

This object is achieved in accordance with the invention by the process for producing a composite polyisocyanurate material according to Claim 1 and the composite polyisocyanurate material obtainable therefrom according to Claim 13.

Advantageous configurations of the invention are specified in the dependent claims and are elucidated individually hereinafter, as is the general concept of the invention.

The invention provides a process for producing a composite polyisocyanurate material, comprising the following steps:

a) providing a polyisocyanate composition A) which comprises oligomeric polyisocyanates and is low in monomeric diisocyanates, "low in monomeric diisocyanates" meaning that the polyisocyanate composition A) has a content of monomeric diisocyanates of not more than 20% by weight, and b) catalytically trimerizing the polyisocyanate composition A) in the presence of at least one fibrous filler B) and of a trimerization catalyst C) to give the composite polyisocyanurate material, where the trimerization catalyst C) comprises at least one quaternary ammonium salt and/or a metal salt.

The invention further provides the composite polyisocyanurate plastics obtainable by the process and for the use thereof for production of components, and also components consisting of or comprising a composite polyisocyanurate material according to the invention.

It has been found that, surprisingly, oligomeric polyisocyanates known as crosslinkers in paint chemistry, in the presence of quaternary ammonium salts and/or of metal salts as catalyst, especially of potassium acetate with complexing agents, and of fibrous fillers, can be polymerized rapidly and efficiently, even under adiabatic conditions, to give composite polyisocyanurate materials having excellent weathering resistance and chemical resistance, and also high thermal stability and good mechanical properties. In the case of use of oligomeric polyisocyanates, even in the case of an adiabatic temperature regime, side reactions that lead to blisters, inhomogeneity and especially discolouration are likewise substantially suppressed and the reaction can be conducted in a reproducible and controlled manner. The process according to the invention allows the production of composite polyisocyanurate materials under quasi-adiabatic conditions without breakdown of the materials used or of desired reaction products or heating thereof above their boiling point.

In a departure from the processes described in the prior art, the trimerization in the process according to the invention can also be conducted at high temperatures and with short reaction times without the drawbacks observed in the prior art, such as blister formation and discolouration. Practical experiments have shown, for example, that complete trimerization can be conducted at temperatures well above 100° C. Particularly advantageously, the trimerization can be conducted at temperatures above the glass transition point of the desired products. Moreover, practical experiments have shown that complete trimerization by the process according to the invention is possible with reaction times of, for example, well below 30 minutes.

By contrast with the processes known from the prior art, the trimerization by the process according to the invention can be conducted in open reaction systems without risking significant release of monomeric diisocyanates into the environment. This especially offers occupational hygiene advantages and allows a cost-efficient process regime.

A further advantage of the process according to the invention with low monomer content is that the volume shrinkage in the cross-linking of the resin to give the finished component or solid is very low, and hence it is possible to provide components with high dimensional accuracy and low internal stresses.

Volume shrinkage is understood by the person skilled in the art to mean a change in volume in the course of crosslinking of the resin to give the plastic because there is a difference in the density of the reactive resin and of the cured plastic. In general, the density of the resin is lower than that of the crosslinked plastic, meaning that the volume decreases during curing (volume shrinkage). As a result, the external dimensions are firstly altered, and it is secondly possible for internal stresses that affect the mechanical properties to occur within the component.

When mention is made here of "solids", this means a body in which complete dissipation of the heat that arises in the trimerization reaction to the environment is not possible with sufficient speed because of its volume and, consequently, local hotspots can occur within the solid, meaning that the trimerization reaction produces more energy within a particular period of time than can be released to the environment within this time. More particularly, a "solid" as used here is a body having, in its direction of lowest expansion, a thickness of at least 0.1 mm, preferably at least 0.5 mm, more preferably at least 1 mm, especially at least 2 mm and most preferably at least 5 mm. More particularly, a "solid" as used here is not a film, paint layer or membrane.

A "composite polyisocyanurate material" as used here is a composite material wherein the polymeric matrix material is a polymer containing polyisocyanurate. The polymeric matrix material may also consist predominantly or entirely of a polyisocyanurate. A polymeric matrix material composed of blends of polyisocyanurates and other plastics is likewise covered by the term "composite polyisocyanurate material" as used here.

When reference is made here to "material", this means a product which is very substantially dimensionally stable at room temperature—in contrast, for example, to gels or liquids. The term "material", as used here, includes all customary classes of plastic, i.e. in particular including thermosets, thermoplastics and elastomers.

When reference is made here to "polyisocyanate composition A)", especially to "providing the polyisocyanate composition A)", this means that the polyisocyanate composition A) exists and is used as reactant.

A "polyisocyanurate" as used here is any molecule having a plurality of isocyanurate structural units, for example at least ten isocyanurate structural units. A molecule having a single isocyanurate structural unit can be referred to as "isocyanurate".

The characteristic cyclic isocyanurate structural unit is shown in the following structural formula:

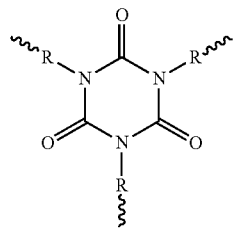

Isocyanurates and polyisocyanurates can be obtained by cyclotrimerization of isocyanates and polyisocyanates. The conventionally operated cyclotrimerization proceeding from monomeric diisocyanates is—as described above—a strongly exothermic reaction. This can considerably restrict the use options and the levels of trimerization—that are still achievable industrially and efficiently.

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

Because of the polyfunctionality (≥2 isocyanate groups), it is possible to use polyisocyanates to prepare a multitude of polymers (e.g. polyurethanes, polyureas and polyisocyanurates) and low molecular weight compounds (for example urethane prepolymers or those having uretdione, isocyanurate, allophanate, biuret, iminooxadiazinedione and/or oxadiazinetrione structure).

When general reference is made here to "polyisocyanates", this means monomeric and/or oligomeric polyisocyanates. For understanding of many aspects of the invention, however, it is important to distinguish between monomeric diisocyanates and oligomeric polyisocyanates. When reference is made here to "oligomeric polyisocyanates", this means polyisocyanates formed from at least two monomeric diisocyanate molecules, i.e. compounds that constitute or contain a reaction product formed from at least two monomeric diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

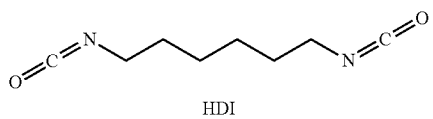

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

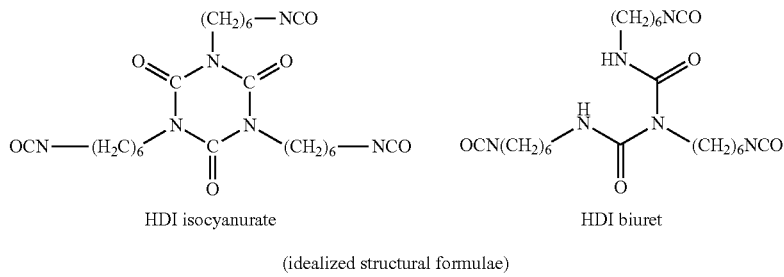

HDI isocyanurate    HDI biuret (idealized structural formulae)

"Polyisocyanate composition A)" in the context of the invention refers to the isocyanate component in the initial reaction mixture. In other words, this is the sum total of all the compounds in the initial reaction mixture that have isocyanate groups. The polyisocyanate composition A) is thus used as reactant in the process according to the invention. When reference is made here to "polyisocyanate composition A)", especially to "providing the polyisocyanate composition A)", this means that the polyisocyanate composition A) exists and is used as reactant.

According to the invention, the polyisocyanate composition A) comprises oligomeric polyisocyanates and is low in monomeric diisocyanates, "low in monomeric diisocyanates" meaning that the polyisocyanate composition A) has a content of monomeric diisocyanates of not more than 20% by weight.

"Low in monomers" and "low in monomeric polyisocyanates" are used synonymously here in relation to the polyisocyanate composition A).

In one embodiment of the invention, the polyisocyanate composition A) consists entirely or to an extent of at least 80%, 85%, 90%, 95%, 98%, 99% or 99.5% by weight, based in each case on the weight of the polyisocyanate composition A), of oligomeric polyisocyanates. Preferably, the polyisocyanate composition A) consists entirely or to an extent of at least 99.7%, 99.8% or 99.9% by weight, based in each case on the weight of the polyisocyanate composition A), of oligomeric polyisocyanates. This content of oligomeric polyisocyanates is based on the polyisocyanate composition A), meaning that they are not formed, for instance, as intermediate during the process according to the invention, but are already present in the polyisocyanate composition A) used as reactant on commencement of the reaction.

The polyisocyanate composition A) used is low in monomers. In practice, this can especially be achieved by using, as polyisocyanate composition A), oligomeric polyisocyanates whose preparation involves, after the actual modification reaction, at least one further process step in each case for removal of the unconverted excess monomeric polyisocyanates. In a manner of particular practical relevance, this monomer removal can be effected by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In one embodiment of the invention, the polyisocyanate composition A) according to the invention is obtained by modifying monomeric polyisocyanates with subsequent removal of unconverted monomers.

The processes for producing polyisocyanurate plastics described in the prior art use very substantially monomeric polyisocyanates, i.e. monomeric diisocyanates, as reactants, meaning that pure monomeric polyisocyanates or monomer-rich polyisocyanate compositions are catalytically trimerized.

In one embodiment of the invention, the polyisocyanate composition A) comprises oligomeric polyisocyanates and includes not more than 20%, 15%, 10%, 5%, 4%, 3%, 2%, 1% or 0.5% by weight, based in each case on the weight of the polyisocyanate composition A), of monomeric polyisocyanates. Preferably, the polyisocyanate composition A) comprises oligomeric polyisocyanates and includes not more than 0.3%, 0.2% or 0.1% by weight, based in each case on the weight of the polyisocyanate composition A), of monomeric polyisocyanates.

In a particular embodiment of the invention, a polyisocyanate composition A) which comprises oligomeric polyisocyanates and is free or essentially free of monomeric polyisocyanates is used. "Essentially free" means that the content of monomeric polyisocyanates is not more than 0.5% by weight, based on the weight of the polyisocyanate composition A). Surprisingly, this leads to much lower volume shrinkage. The relatively low exothermicity of this reaction additionally still allows high-quality polyisocyanurate plastics to be obtained in spite of more rapid and severe reaction conditions.

In a further particular embodiment of the invention, the polyisocyanate composition A) may comprise one or more extra monomeric diisocyanates. In this context, "extra monomeric diisocyanate" means that it differs from the monomeric polyisocyanates which have been used for preparation of the oligomeric polyisocyanates present in the polyisocyanate composition A). Addition of extra monomeric diisocyanate can be advantageous for achieving specific technical effects, for example a particular hardness, a desired elasticity or elongation, or a desired glass transition temperature or viscosity, in the course of processing. Results of particular practical relevance are established when the polyisocyanate composition A) has a proportion of extra monomeric diisocyanate in the polyisocyanate composition A) of not more than 20% by weight, especially not more than 15% by weight or not more than 10% by weight, based in each case on the weight of the polyisocyanate composition A). Preferably, the polyisocyanate composition A) has a content of extra monomeric diisocyanate of not more than 5% by weight, especially not more than 2.0% by weight, more preferably not more than 1.0% by weight, based in each case on the weight of the polyisocyanate composition A).

In a further particular embodiment of the process according to the invention, the polyisocyanate composition A) may contain monomeric monoisocyanates having an isocyanate functionality of 1 or monomeric isocyanates having an isocyanate functionality greater than 2, i.e. having more than two isocyanate groups per molecule. The addition of monomeric monoisocyanates having an isocyanate functionality of 1 or monomeric isocyanates having an isocyanate functionality greater than two has been found to be advantageous in order to influence the network density and/or glass transition temperature of the polyisocyanurate plastic. The mean isocyanate functionality of the polyisocyanate composition A) is greater than 1, preferably greater than 1.25, especially greater than 1.5, more preferably greater than 1.75 and most preferably greater than 2. The mean isocyanate functionality of the polyisocyanate composition A) can be calculated by dividing the sum total of isocyanate functionalities of all polyisocyanate molecules present in the polyisocyanate composition A) by the number of polyisocyanate molecules present in the polyisocyanate composition A). Results of particular practical relevance are established when the polyisocyanate composition A) has a proportion of monomeric monoisocyanates having an isocyanate functionality of 1 or monomeric isocyanates having an isocyanate functionality greater than two in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric monoisocyanates having an isocyanate functionality of 1 or monomeric isocyanates having an isocyanate functionality greater than 2 of not more than 5% by weight, especially not more than 2.0% by weight, more preferably not more than 1.0% by weight, based in each case on the weight of the polyisocyanate composition A). Preferably, no monomeric monoisocyanate having an isocyanate functionality of 1 or monomeric isocyanate having an isocyanate functionality greater than 2 is used in the trimerization reaction according to the invention.

The oligomeric polyisocyanates described here are typically obtained by modifying simple aliphatic, cycloaliphatic, araliphatic and/or aromatic monomeric diisocyanates or mixtures of such monomeric diisocyanates.

The oligomeric polyisocyanates may, in accordance with the invention, especially have uretdione, urethane, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

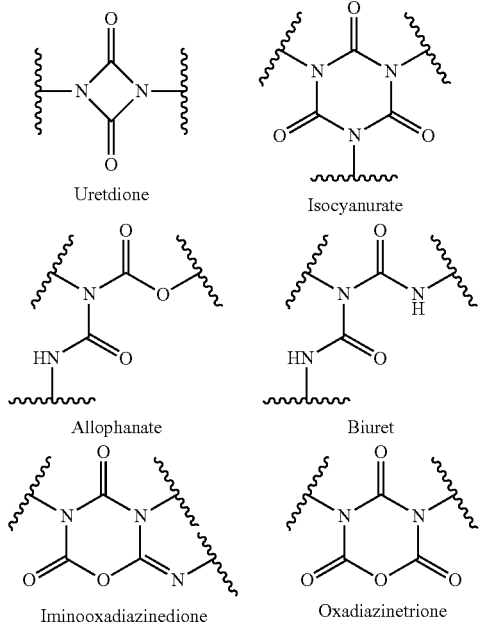

Uretdione
Isocyanurate
Allophanate
Biuret
Iminooxadiazinedione
Oxadiazinetrione

It has been found that, surprisingly, it can be advantageous to use oligomeric polyisocyanates that are a mixture of at least two oligomeric polyisocyanates, the at least two oligomeric polyisocyanates differing in terms of structure. This structure is preferably selected from the group consisting of uretdione, urethane, isocyanurate, allophanate, biuret, iminooxadiazinedione and oxadiazinetrione structure, and mixtures thereof. Starting mixtures of this kind can especially lead, by comparison with trimerization reactions with oligomeric polyisocyanates of just one defined structure, to an effect on the Tg value, which is advantageous for many applications.

Preference is given to using, in the process according to the invention, a polyisocyanate composition A) consisting of at least one oligomeric polyisocyanate having biuret, allophanate, isocyanurate and/or iminooxadiazinedione structure and mixtures thereof. Preference is given to using, in the process according to the invention, a polyisocyanate composition A) containing not more than 50 mol %, preferably not more than 40 mol %, more preferably not more than 30 mol %, even more preferably not more than 20 mol %, 10 mol %, 5 mol %, 3 mol %, 2 mol %, 1 mol %, and especially no oligomeric polyisocyanates having urethane structure, for example urethane prepolymers.

In another embodiment, the polyisocyanate composition A) containing oligomeric polyisocyanates is one containing just a single defined oligomeric structure, for example exclusively or for the most part an isocyanurate structure. In general, as a result of the preparation, however, there are always several different oligomeric structures present alongside one another in the polyisocyanate composition A).

In the context of the present invention, a polyisocyanate composition A) is regarded as a polyisocyanate composition of a single defined oligomeric structure when an oligomeric structure selected from uretdione, urethane, isocyanurate, allophanate, biuret, iminooxadiazinedione and/or oxadiazinetrione structure is present to an extent of at least 50 mol %, preferably 60 mol %, more preferably 70 mol %, especially preferably 80 mol % and particularly 90 mol %, based in each case on the sum total of the oligomeric structures from the group consisting of uretdione, urethane, isocyanurate, allophanate, biuret, iminooxadiazinedione and oxadiazinetrione structure present in the polyisocyanate composition A).

In the process according to the invention, in a further embodiment, a polyisocyanate composition A) of a single defined oligomeric structure is used, the oligomeric structure being selected from uretdione, urethane, isocyanurate, allophanate, biuret, iminooxadiazinedione and/or oxadiazinetrione structure and being present to an extent of at least 50 mol %, preferably 60 mol %, more preferably 70 mol %, especially preferably 80 mol % and particularly 90 mol %, based in each case on the sum total of the oligomeric structures present from the group consisting of uretdione, urethane, isocyanurate, allophanate, biuret, iminooxadiazinedione and oxadiazinetrione structure in the polyisocyanate composition A).

In a further embodiment, the oligomeric polyisocyanates are those which have mainly isocyanurate structure and which may contain the abovementioned uretdione, urethane, allophanate, biuret, iminooxadiazinedione and/or oxadiazinetrione structure only as by-products. Thus, one embodiment of the invention envisages the use of a polymer composition A) of a single defined oligomeric structure, the oligomeric structure being an isocyanurate structure and being present to an extent of at least 50 mol %, preferably 60 mol %, more preferably 70 mol %, especially preferably 80 mol % and particularly 90 mol %, based in each case on the sum total of the oligomeric structures from the group consisting of uretdione, urethane, isocyanurate, allophanate, biuret, iminooxadiazinedione and oxadiazinetrione structure present in the polyisocyanate composition A).

It is likewise possible in accordance with the invention to use oligomeric polyisocyanates having very substantially no isocyanurate structure, and containing mainly at least one of the abovementioned uretdione, urethane, allophanate, biuret, iminooxadiazinedione and/or oxadiazinetrione structure types. In a particular embodiment of the invention, the polyisocyanate composition A) consists to an extent of 50 mol %, preferably 60 mol %, more preferably 70 mol %, especially preferably 80 mol % and particularly 90 mol %, based in each case on the sum total of the oligomeric structures from the group consisting of uretdione, urethane, isocyanurate, allophanate, biuret, iminooxadiazinedione and oxadiazinetrione structure present in the polyisocyanate composition A), of oligomeric polyisocyanates having a structure type selected from the group consisting of uretdione, urethane, allophanate, biuret, iminooxadiazinedione and/or oxadiazinetrione structure.

A further embodiment of the invention envisages the use of a low-isocyanurate polyisocyanate composition A) having, based on the sum total of the oligomeric structures from the group consisting of uretdione, urethane, isocyanurate, allophanate, biuret, iminooxadiazinedione and oxadiazinetrione structure present in the polyisocyanate composition A), less than 50 mol %, preferably less than 40 mol %, more preferably less than 30 mol % and especially preferably less than 20 mol %, 10 mol % or 5 mol % of isocyanurate structures.

A further embodiment of the invention envisages the use of a polymer composition A) of a single defined oligomeric structure type, said oligomeric structure type being selected from the group consisting of uretdione, allophanate, biuret, iminooxadiazinedione and/or oxadiazinetrione structure and this structure type being present to an extent of at least 50 mol %, preferably 60 mol %, more preferably 70 mol %, especially preferably 80 mol % and particularly 90 mol %, based on the sum total of the oligomeric structures from the group consisting of uretdione, urethane, isocyanurate, allophanate, biuret, iminooxadiazinedione and oxadiazinetrione structure present in the polyisocyanate composition A).

The proportions of uretdione, urethane, isocyanurate, allophanate, biuret, iminooxadiazinedione and/or oxadiazinetrione structure in the polyisocyanate composition A) can be calculated, for example, from the integrals of proton-decoupled $^{13}$C NMR spectra, since the oligomeric structures mentioned give characteristic signals, and each is based on the sum total of uretdione, urethane, isocyanurate, allophanate, biuret, iminooxadiazinedione and/or oxadiazinetrione structures in the polyisocyanate composition A).

Irrespective of the underlying oligomeric structure type (uretdione, urethane, isocyanurate, allophanate, biuret, iminooxadiazinedione and/or oxadiazinetrione structure), the polyisocyanate composition A) for use in the process according to the invention preferably has a (mean) NCO functionality of 1.0 to 6.0, preferably 2.0 to 5.0, more preferably of 2.3 to 4.5.

Results of particular practical relevance are established when the polyisocyanate composition A) for use in accordance with the invention has a content of isocyanate groups of 8.0% to 60.0% by weight. It has been found to be of particular practical relevance when the polyisocyanate composition A) according to the invention has a content of isocyanate groups of 14.0% to 30.0% by weight, based in each case on the weight of the polyisocyanate composition A).

Preparation processes for oligomeric polyisocyanates having uretdione, urethane, isocyanurate, allophanate, biuret, iminooxadiazinedione and/or oxadiazinetrione structure are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A) is defined in that it contains oligomeric polyisocyanates which have been obtained from monomeric polyisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which are consumed during the preparation process to form uretdione, urethane, isocyanurate, allophanate, biuret, iminooxadiazinedione and/or oxadiazinetrione structures.

Suitable starting compounds for the oligomeric polyisocyanates are any desired monomeric polyisocyanates obtainable in various ways, for example by phosgenation in the liquid or gas phase or by a phosgene-free route, for example by thermal urethane cleavage. Particularly good results are established when the monomeric polyisocyanates are monomeric diikcyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable can additionally be found, for example, in *Justus Liebigs Annalen der Chemie, volume* 562 (1949) p. 75-136.

In addition, it is also possible in the process according to the invention to use conventional prepolymers bearing aliphatic or aromatic isocyanate end groups, for example polyether, polyester or polycarbonate prepolymers bearing aliphatic or aromatic isocyanate end groups, as mono- and polyisocyanates in the polyisocyanate composition A).

Suitable monomeric monoisocyanates which can optionally be used in the polyisocyanate composition A) are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the polyisocyanate composition A) is 4-isocyanatomethyloctane 1,8-diisocyanate (triisocyanatononane; TIN).

In one embodiment of the invention, the polyisocyanate composition A) contains not more than 80% by weight, especially not more than 50% by weight, not more than 25% by weight, not more than 10% by weight, not more than 5% by weight or not more than 1% by weight, based in each case on the weight of the polyisocyanate composition A), of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the process according to the invention, a polyisocyanate composition A) having exclusively aliphatically and/or cycloaliphatically bonded isocyanate groups is used.

Aliphatically and cycloaliphatically bonded isocyanate groups are understood to mean isocyanate groups bonded, respectively, to an aliphatic and cycloaliphatic hydrocarbyl radical.

In another preferred embodiment of the process according to the invention, a polyisocyanate composition A) consisting of or comprising one or more oligomeric polyisocyanates is used, where the one or more oligomeric polyisocyanates has/have exclusively aliphatically and/or cycloaliphatically bonded isocyanate groups.

In another preferred embodiment of the process according to the invention, a polyisocyanate composition A) consisting of or comprising one or more monomeric polyisocyanates is used, where the one or more monomeric polyisocyanates has/have exclusively aliphatically and/or cycloaliphatically bonded isocyanate groups.

In a further embodiment of the invention, the polyisocyanate composition A) consists to an extent of at least 70%, 80%, 85%, 90%, 95%, 98% or 99% by weight, based in each case on the weight of the polyisocyanate composition A), of oligomeric polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment of the process according to the invention, a polyisocyanate composition A) is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

The catalytic trimerization of the polyisocyanate composition A), in the process according to the invention, takes place in the presence of a fibrous filler B).

Suitable fibrous fillers B) are, for example, all inorganic fibres, organic fibres, natural fibres or mixtures thereof that are known to those skilled in the art.

Fibrous fillers are understood to mean materials wherein the aspect ratio, i.e. the length divided by the diameter, is greater than 5, preferably greater than 20, especially greater than 50 and more preferably greater than 100.

Examples of the inorganic fibres that are suitable in accordance with the invention are glass fibres, basalt fibres, boron fibres, ceramic fibres, whiskers, silica fibres and metallic reinforcing fibres. Examples of organic fibres that are suitable in accordance with the invention are aramid fibres, carbon fibres, polyester fibres, nylon fibres and Plexiglas fibres. Examples of natural fibres that are suitable in accordance with the invention are flax fibres, hemp fibres, wood fibres, cellulose fibres and sisal fibres.

In a preferred embodiment of the invention, the individual fibres have a diameter of less than 0.1 mm, preferably less than 0.05 mm, more preferably less than 0.02 mm, especially less than 0.015 mm, most preferably less than 0.01 mm.

In a preferred embodiment of the invention, the fibrous filler B) is selected from the group consisting of glass fibres, basalt fibres, carbon fibres and mixtures thereof.

In a particularly preferred embodiment of the invention, the fibrous fillers used are glass fibres and/or carbon fibres, especially glass fibres.

In a preferred embodiment of the invention, the fibre content in the composite polyisocyanurate material is more than 10% by weight, preferably more than 30% by weight, more preferably more than 50% by weight, preferably more than 60% by weight, even more preferably more than 70% by weight, especially 80%, 85%, 90% by weight, based on the composite polyisocyanurate material.

The polyisocyanurates according to the invention are obtainable by catalytic trimerization by the process according to the invention. "Catalytic" here means in the presence of a suitable trimerization catalyst C).

Suitable trimerization catalysts C) for the process according to the invention are in principle all compounds which comprise at least one metal salt and/or quaternary ammonium salt and which are suitable for accelerating the trimerization of isocyanate groups to isocyanurate structures.

According to the invention, the trimerization catalyst C) comprises at least one metal salt or quaternary ammonium salt as catalyst. In the context of the invention, a "quaternary ammonium" is understood to mean a compound of the formula $NR_4^+$ where the "R" radical comprises organic radicals, especially alkyl or aryl radicals. Preferably, the quaternary ammonium is a compound of the formula $NR_4^+$ where each of the R radicals is independently a linear or branched alkyl radical having 1 to 5 carbon atoms.

In a further particularly preferred embodiment of the process according to the invention, the trimerization catalyst C) comprises, as metal component, an alkaline alkali metal salt or alkaline earth metal salt which, as a saturated aqueous solution, has a pH of greater than 7, particularly greater than 8 and especially greater than 9 (measured with litmus paper) at 23° C. Particular preference is given to sodium salts and potassium salts. It is best to use potassium salts.

Preferred trimerization catalysts C) comprise, as metal salt, carboxylates and alkoxides of metals. Preferred trimerization catalyst C) include metal salts of aliphatic carboxylic acids having 1 to 20 and especially 1 to 10 carbon atoms, for example metal salts of formic acid, acetic acid, propionic acid, butyric acid, valeric acid, caproic acid, 2-ethylhexanoic acid, enanthic acid, caprylic acid, pelargonic acid and capric acid. Particular preference is given to acetate salts.

In a preferred embodiment of the process according to the invention, the trimerization catalyst C) comprises, as metal component, an element selected from the group consisting of alkali metals, alkaline earth metals, tin, zirconium, zinc, iron and titanium.

In a particularly preferred embodiment, the trimerization catalyst C) comprises, as metal component, an alkali metal or alkaline earth metal. Particularly preferred metal components are sodium and potassium.

In a further preferred embodiment, the metal salt is an alkali metal acetate or octoate or alkaline earth metal acetate or octoate, most preferably an alkali metal acetate, especially potassium acetate. Tin octoate is likewise preferred.

In a further preferred embodiment, the trimerization catalyst C) comprises a polyether. Preferred polyethers are selected from the group consisting of crown ethers, diethylene glycol, polyethylene glycols and polypropylene glycols. It has been found to be of particular practical relevance in the process according to the invention to use a trimerization catalyst C) comprising, as polyether, a polyethylene glycol or a crown ether, more preferably 18-crown-6 or 15-crown-5.

Preferably, the trimerization catalyst C) may comprise a polyethylene glycol having a number-average molecular weight of 106 to 1000 g/mol, preferably 200 to 1000 g/mol, more preferably 300 g/mol to 500 g/mol and especially 350 g/mol to 450 g/mol. In this application, the term "polyethylene glycol" also refers to diethylene glycol.

The number-average molecular weight is always determined in the context of this application by gel permeation chromatography (GPC) in tetrahydrofuran at 23° C. The procedure is according to DIN 55672-1: "Gel permeation chromatography, Part 1—Tetrahydrofuran as eluent" (SE-Curity GPC System from PSS Polymer Service, flow rate 1.0 ml/min; columns: 2×PSS SDV linear M, 8×300 mm, 5 μm; RID detector). Polystyrene samples of known molar mass are used for calibration. The number-average molecular weight is calculated with software support. Baseline points and evaluation limits are fixed in accordance with DIN 55672 Part 1.

The polyethers may also bear further functionalities, for example at the polyether chain ends or in the polyether chain, in order to assure better solubility in the polyisocyanate composition A) or better co-catalytic action. Derivatized polyethers of this kind are also covered here by the term "polyether".

Very particularly preferred trimerization catalysts C) for the process according to the invention comprise potassium acetate or potassium octoate as alkali metal salt and polyethylene glycols as polyether, especially potassium acetate and polyethylene glycol having a number-average molecular weight of 400 g/mol.

The trimerization catalysts C) can be used in the process according to the invention either individually or in the form of any desired mixtures with one another.

The catalyst concentration, as well as the temperature, is an important setting parameter for the process for producing the composite polyisocyanurate materials. If the concentration of the catalyst in the reactive resin mixture is too low, the crosslinking reaction overall is too slow and the process is inefficient. If the catalyst concentration in the reactive resin mixture is too high, this reduces the pot life of the resin mixture, defined as the time span from the mixing of the polyisocyanate composition A) with the trimerization catalyst C) until the juncture at which the viscosity of the reaction mixture at 23° C. is twice the starting value, to too significant a degree and the process can no longer be performed in a practicable manner.

In the process according to the invention, the trimerization catalyst C) is generally used in a concentration based on the amount of the polyisocyanate composition A) used of 0.04% to 15.0% by weight, preferably of 0.10% to 8.0% by weight and more preferably of 0.5% to 5.0% by weight. In this case, for calculation of the concentration, the trimerization catalyst C) considered is merely the mixture of the at least one basic compound of the alkali metals or alkaline earth metals and the at least one polyether.

The trimerization catalysts C) that are used in the process according to the invention generally have sufficient solubility or dispersibility in the polyisocyanate composition A) in the amounts that are required for initiation of the oligomerization reaction. The trimerization catalyst C) is therefore preferably added to the polyisocyanate composition A) in neat form.

Addition of the trimerization catalyst C) in neat form means that the metal salt and/or quaternary ammonium salt, if required, is dissolved or at least suspended in a suitable catalyst solvent. The proportion of the metal salt and/or quaternary ammonium salt in this solution can be chosen freely over a wide range within the scope of optimization of the process conditions, but for practical reasons is usually less than 50% by weight, preferably less than 25% by weight, more preferably less than 20% by weight or less than 15% by weight and especially less than 10% by weight. However, the proportion is in any case greater than 0.1% by weight. The aforementioned proportions are based on the total weight of metal salt and/or quaternary ammonium salt and polyether.

Optionally, however, the trimerization catalysts C) can also be used dissolved in a suitable organic solvent to improve their incorporability. The dilution level of the catalyst solutions can be freely selected within a very wide range.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

It has been found to be particularly advantageous when the metal salt or ammonium salt and the polyether are not added individually and separately to the polyisocyanate and only then mixed, but when the metal salt or ammonium salt is first dissolved in the polyether in a first step and this solution is added to the polyisocyanate composition A) in a second step. In addition, it has been found that the alkaline salts and especially the alkaline potassium and sodium salts have better solubility in polyethers based on ethylene oxide compared to polyethers based on propylene oxide. Preference is therefore given to the addition of a catalyst solution consisting of at least the metal salt or ammonium salt dissolved in the polyether to the polyisocyanate composition A), particular preference being given to the addition of a catalyst solution consisting of an alkaline metal salt dissolved in polyethylene glycol to the polyisocyanate composition A), most preference being given to the addition of a catalyst solution consisting of an alkaline potassium salt dissolved in a polyethylene glycol (mean molar mass between 106 and 1000 g/mol) to the polyisocyanate composition A).

As well as the function as a solvent for the metal salt, the polyether can also simultaneously contribute to the activation and enhancement of the catalytic action. This is especially true in the case of use of alkali metal and alkaline earth metal salts. This effect is observed in the case of many polyethers, but is at its most marked for the process according to the invention in the case of use of polyethers based on ethylene oxide. It has been found here to be advantageous when a plurality of ethylene oxide units are polymerized in immediate succession. Preference is therefore given to polyethers containing at least 3, preferably 5 and most preferably 7 ethylene oxide units in succession in the polymer chain. It is preferable that the polyether, complying with the aforementioned minimum lengths, contains not more than 10 ethylene oxide units in immediate succession.

The corresponding metal salt may in principle be present in the polyether up to saturation, since there is always elevated activation of at least a portion of the metal salt by the polyether. For practical reasons, the lower limit in the metal salt concentration results from the dilution of the polyisocyanate mixture with polyether when the metal concentration in the ether is too low. Preference is therefore given to a metal ion concentration of the catalytic metal salt in the polyether between 0.01% by weight and 50% by weight, preferably between 0.1% by weight and 25% by weight, more preferably between 0.5% by weight and 15% by weight, and especially between 1% by weight and 10% by weight.

In a particularly preferred embodiment of the process according to the invention, the catalyst includes a polyether having at least 5 successive ethylene oxide units in the molecule, in which an alkaline potassium, lithium or sodium salt having a metal ion concentration between 0,01% by weight and 30% by weight, preferably between 0.1% by weight and 25% by weight, more preferably between 0.5% by weight and 15% by weight and especially between 1% by weight and 10% by weight is dissolved. Most preferred is a polyether having at least 7 successive ethylene oxide units in the molecule, in which an alkaline potassium salt having a potassium ion concentration between 0.5% by weight and 15% by weight has been dissolved. If polyethers having at least 11 successive ethylene oxide units that are no longer liquid at room temperature are used, preference is given to the use of additional solvents as described below.

If catalyst solvents are used in the process according to the invention, preference is given to using catalyst solvents which bear groups reactive toward isocyanates and can be incorporated into the polyurethane plastic. Examples of such solvents are mono- and polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

Since isocyanurate formation, depending on the catalyst used, is frequently accompanied by side reactions, for example dimerization to give uretdione structures or trimerization to form iminooxadiazinediones (called asymmetric trimers), and, in the presence of urethane groups in the starting polyisocyanate, by allophanatization reactions, the term "trimerization" in the context of the present invention is also to be used synonymously for these reactions that proceed additionally.

In a particular embodiment, however, trimerization means that predominantly cyclotrimerizations of at least 50%, preferably at least 60%, more preferably at least 70%, especially at least 80% and most preferably 90% of isocyanate groups present in the polyisocyanate composition A) to give isocyanurate structural units are catalysed. However, side reactions, especially those to give uretdione, allophanate and/or iminooxadiazinedione structures, typically occur and can even be used in a controlled manner in order to advantageously affect, for example, the glass transition temperature (Tg) of the polyisocyanurate plastic obtained.

The composite polyisocyanurate materials obtainable by the process according to the invention, even as such, i.e. without addition of appropriate auxiliaries and additives D), feature very good light stability and/or weathering resistance. Nevertheless, it is optionally possible to use standard auxiliaries and additives D) as well in the production thereof, for example standard fillers, UV stabilizers, antioxidants, mould release agents, water scavengers, slip additives, defoamers, levelling agents, rheology additives, flame retardants and/or pigments. These auxiliaries and additives D), excluding fillers and flame retardants, are typically present in the composite polyisocyanurate material in an amount of less than 10% by weight, preferably less than 5% by weight, more preferably up to 3% by weight, based on the polyisocyanate composition A). Flame retardants are typically present in the composite polyisocyanurate material in amounts of not more than 70% by weight, preferably not more than 50% by weight and more preferably not more than 30% by weight, calculated as the total amount of flame retardants used, based on the total weight of the polyisocyanate composition A).

Suitable fillers $D_w$) are, for example, $AlOH_3$, $CaCO_3$, silicon dioxide, magnesium carbonate, minerals comprising silicates, sulphates, carbonates and the like, such as magnesite, baryte, mica, dolomite, kaolin, clay minerals, metal pigments such as $TiO_2$, and other known customary fillers. These fillers $D_w$) are preferably used in amounts of not more than 80% by weight, preferably not more than 60% by weight, more preferably not more than 40% by weight, even more preferably not more than 30% by weight, especially not more than 20%, 10%, 5% by weight, calculated as the total amount of fillers used, based on the total weight of the polyisocyanate composition A).

Suitable UV stabilizers $D_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4 butoxybenzylidenemalonate. These preferred light stabilizers can be used either individually or in any desired combinations with one another.

Particularly preferred UV stabilizers $D_x$) for the composite polyisocyanurate materials producible in accordance with the invention are those which fully absorb radiation of wavelength <400 nm. These include, for example, the benzotriazole derivatives mentioned. Very particularly preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

It is optionally possible to add one or more of the UV stabilizers $D_x$) mentioned by way of example to the polyisocyanate composition A), preferably in amounts of 0.001% to 3.0% by weight, more preferably 0.01% to 2% by weight, calculated as the total amount of UV stabilizers used, based on the total weight of the polyisocyanate composition A).

Suitable antioxidants $D_y$) are preferably sterically hindered phenols, which may be selected preferably from the group consisting of vitamin E, 2,6-di-tert-butyl-4-methylphenol (ionol) and derivatives thereof, pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. If required, they can be used either individually or in any desired combinations with one another.

These antioxidants $D_y$) are preferably used in amounts of 0.01% to 3.0% by weight, more preferably 0.02% to 2.0% by weight, calculated as the total amount of antioxidants used, based on the total weight of the polyisocyanate composition A).

The process according to the invention can, apart from the small amounts of any catalyst solvents to be used in addition, be conducted in a solvent-free manner.

Further auxiliaries and additives D) added, finally, may also be internal mould release agents $D_z$).

These are preferably the nonionic surfactants containing perfluoroalkyl or polysiloxane units that are known as mould release agents, quaternary alkylammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic monoalkyl and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, waxes such as beeswax, montan wax or polyethylene oligomers, metal salts and esters of oily and fatty acids such as barium stearate, calcium stearate, zinc stearate, glycerol stearate and glycerol laurate, esters of aliphatic branched and unbranched alcohols having 4 to 36 carbon atoms in the alkyl radical, and any desired mixtures of such mould release agents.

Particularly preferred mould release agents $D_z$) are the fatty acid esters and salts thereof mentioned, and also acidic mono- and dialkyl phosphates mentioned, most preferably those having 8 to 36 carbon atoms in the alkyl radical.

Internal mould release agents $D_z$) are used in the process according to the invention, if appropriate, preferably in amounts of 0.01% to 15.0% by weight, more preferably 0.02% to 10.0% by weight, especially 0.02% to 5.0% by weight, calculated as the total amount of internal mould release agent used, based on the total weight of the polyisocyanate composition A).

In one embodiment of the process of the invention, a trimerization catalyst C) or a mixture of different trimerization catalysts C) is added to the polyisocyanate composition A) described, optionally under inert gas, for example nitrogen, and optionally with additional use of the aforementioned solvents and auxiliaries and additives D), and mixed in homogeneously with the aid of a suitable mixing unit and added to the fibrous filler B). The addition of catalyst C) and any solvent and auxiliaries and additives D) for additional use can take place in any sequence, successively or in a mixture, in the above-specified amounts and generally at a temperature of 0 to 100° C., preferably of 15 to 80° C., more preferably of 20 to 60° C. It is likewise conceivable that the mixture of polyisocyanate composition A), optionally under inert gas, for example nitrogen, and optionally with additional use of the aforementioned solvents and auxiliaries and additives D), a trimerization catalyst C) or a mixture of different trimerization catalysts C) is first initially charged, and then the fibrous filler B) is added. In a particular embodiment of the invention, the reaction mixture thus obtained has a pot life, as defined above, of greater than 10 min, preferably greater than 30 min, more preferably greater than 60 minutes, especially greater than 120 minutes. This assures both reliable miscibility and safe and reliable processing and good wetting of the fibres in virtually all composite production processes without the risk of a reaction proceeding in a premature uncontrolled manner.

In a preferred embodiment of the invention, at least the polyisocyanate composition A), more preferably also the mixture of fibrous filler B), catalyst C) and polyisocyanate composition A), is degassed by customary methods prior to the reaction. Preferably, the polyisocyanate composition A) of the invention and/or else the mixture of fibrous filler B), catalyst C) and polyisocyanate composition A) is carefully degassed prior to the reaction at temperatures between 10 and 100° C.

For production of solid bodies, for example components, reaction mixtures comprising the catalyst C) and the polyisocyanate composition A) may be introduced into open or closed moulds that already contain a fibrous filler B), for example by simple manual pouring, or with the aid of suitable machinery, for example the low-pressure or high-pressure machinery which is standard in polyurethane technology. Fibrous filler B) can alternatively be introduced after introduction of the reaction mixture of catalyst C) and polyisocyanate composition A) into the mould. Alternatively, the fibrous filler B) and the reaction mixture of catalyst C) and polyisocyanate composition A) can first be mixed and this mixture can be introduced into a mould.

The trimerization reaction can be started by heating. The optimal mould or ambient temperature, depending on the catalyst C) selected in each case, is 80 to 250° C., preferably from 100 to 230° C., more preferably from 150 to 200° C. Particularly advantageously, the trimerization can be conducted at temperatures above the glass transition point of the desired products. In a particular embodiment of the invention, the temperature of the reaction mixture in the course of the reaction reaches more than 80° C. but remains below 350° C., preferably below 300° C., more preferably <250° C., even locally.

Depending on the trimerization catalyst C) chosen, the polyisocyanate composition A) and the reaction temperature chosen, the trimerization reaction is very substantially complete, as defined below, after a period of a few seconds up to a few hours. In practice, it has been found that the trimerization reaction at reaction temperatures of greater than 150° C. is typically very substantially complete within less than 30 minutes. In one embodiment, the catalytic trimerization at a temperature of greater than 150° C. is very substantially complete within less than 10 minutes, especially less than 5 minutes, as defined below.

When "ambient temperatures" are being discussed here, this means the ambient temperature. In a preferred embodiment of the invention, the trimerization reaction at a reaction temperature of greater than 80° C., preferably 100° C., especially greater than 120° C., preferably greater than 150° C., more preferably greater than 170° C., is very substantially complete within less than 10 minutes, more preferably less than 5 minutes, even more preferably less than 3 minutes, preferably less than 1 minute, especially less than 45 seconds. In a further preferred embodiment of the invention, the trimerization reaction at a reaction temperature of less than 250° C., especially less than 230° C., preferably less than 200° C., more preferably less than 190° C., is very substantially complete within less than 5 minutes, more preferably less than 3 minutes, especially less than 1 minute, most preferably less than 45 seconds.

These reaction rates are preferably achieved by using salts of alkali metals or alkaline earth metals in combination with polyethers.

A trimerization reaction to give polyisocyanurate structures can be regarded as "very substantially complete" in the context of the present invention when at least 80%, preferably at least 90%, more preferably at least 95% and especially at least 98%, most preferably 99%, of the free isocyanate groups originally present in the polyisocyanate composition A) have reacted. In other words, preferably only not more than 20%, not more than 10%, more preferably not more than 5%, especially not more than 2% and most preferably not more than 1% of the isocyanate groups originally present in the polyisocanate composition A) are present in the composite polyisocyanurate material obtained by the process according to the invention.

The progress of the reaction can initially still be determined by titrimetric determination of the NCO content, but gelation and solidification of the reaction mixture sets in rapidly with advancing conversion, which makes wet-chemical analysis methods impossible. The further conversion of isocyanate groups can then only be monitored by spectroscopic methods, for example by IR spectroscopy with reference to the intensity of the isocyanate band at about 2270 cm$^{-1}$.

The invention also provides the composite polyisocyanurate material obtainable by the process according to the invention. The composite polyisocyanurate material obtainable by the process according to the invention is preferably one that includes, as polymeric matrix material, polyisocyanurates with a high degree of conversion, i.e. those in which the trimerization reaction to give polyisocyanurate structures is very substantially complete. A trimerization reaction to give polyisocyanurate structures can be regarded as "very substantially complete" in the context of the present invention when at least 80%, preferably at least 90%, more preferably at least 95% and especially at least 98%, most preferably 99%, of the free isocyanate groups originally present in the polyisocanate composition A) have reacted. In other words, preferably only not more than 20%, not more than 10%, more preferably not more than 5%, especially not more than 2% and most preferably not more than 1% of the isocyanate groups originally present in the polyisocanate composition A) are present in the composite polyisocyanurate material obtained by the process according to the invention. This can be achieved by conducting the catalytic trimerization in the process according to the invention at least up to a conversion level at which only, for example, not more than 20% of the isocyanate groups originally present in the polyisocyanate composition A) are present, such that a polyisocyanurate with high conversion is obtained. The percentage of isocyanate groups still present can be determined by a comparison of the content of isocyanate groups in % by weight in the original polyisocyanate composition A) with the content of isocyanate groups in % by weight in the reaction product, for example by the aforementioned comparison of the intensity of the isocyanate band at about 2270 cm$^{-1}$ by means of IR spectroscopy.

In a preferred embodiment, the total content of extractable isocyanate-containing compounds in the composite polyisocyanurate material of the invention, based on the polyisocyanate composition A) used, is less than 1% by weight. The total content of extractable isocyanate-containing compounds can be determined in a particularly practicable manner by methods known per se, preferably by extraction with suitable solvents that are inert toward isocyanate groups, for example aliphatic or cycloaliphatic hydrocarbons such as pentane, hexane, heptane, cyclopentane, cyclohexane, toluene or xylene and subsequent determination of the isocyanate group content in the extract, for example by IR spectroscopy.

In another preferred embodiment, the non-additized composite polyisocyanurate materials according to the invention have a b* value determined in accordance with DIN 5033 in the L*a*b* colour space of less than 8, more preferably less than 7 and especially less than 6.5. "Non-additized" in this context means that the composite polyisocyanurate material does not contain any pigments, or has not been coloured by addition of pigments. Every colour in the L*a*b* colour space is defined by a colour locus having the Cartesian coordinates {L*, a*, b*}. The L* axis describes the brightness (luminance) of the colour with values of 0 to 100. The a* axis describes the green or red component of a colour, negative values representing green and positive values representing red. The b* axis describes the blue or yellow component of a colour, negative values representing blue and positive values representing yellow. Relatively high positive b* values therefore indicate significant yellowing which is unwanted for many applications.

In a further preferred embodiment, the composite polyisocyanurate materials according to the invention have a b value smaller by at least 5%, preferably 10%, more preferably 15% and especially 25% compared to samples that have been produced under the same conditions with the same material composition but without fibrous filler B).

In a further preferred embodiment, the composite polyisocyanurate materials according to the invention have a b value smaller by at least 0.35, preferably 0.5, more preferably 0.75, even more preferably 1 and especially 2 unit(s) compared to samples which have been produced under the same conditions with the same material composition but without fibres.

By the process according to the invention, it is possible in a very efficient manner to obtain homogeneous, blister-free composite polyisocyanurate materials. The degree of freedom of a composite polyisocyanurate material from blisters can be specified via the density. This is done by first determining the mean density of the composite polyisocyanurate material. Then the density of the fibre material is determined (if not known anyway). The two values can then also be used to calculate the density of the matrix material.

The composite polyisocyanurate materials according to the invention especially feature a density of the polyisocyanurate resin matrix of greater than 1.00 g/cm³, determined in accordance with DIN EN ISO 1183-1.

The process of the invention especially affords composite polyisocyanurate materials having a mean density of greater than 1.30 g/cm³, preferably greater than 1.5 g/cm³ and more preferably greater than 1.7 g/cm³.

The composite polyisocyanurate materials obtainable by the process according to the invention, according to the nature of the polyisocyanate composition A) used, as well as isocyanurate structures, may contain further oligomeric structures and are notable for excellent thermal stabilities and weathering resistances.

Weathering resistance can be determined, for example, with the aid of accelerated weathering tests. This is done by exposing the sample to defined amounts and periods of UVA and UVB radiation, heat and moisture according to the standard chosen.

The process according to the invention especially affords composite polyisocyanurate materials which, in the case of weathering with a Ci 5000 or Ci 4000 instrument from Atlas Material Testing Technology according to standard SAE J 2527, do not show any significant changes in the sample after 500 h, preferably after 1000 h, more preferably after 2000 h and especially after 4000 h. For example, there is an increase in the above-described b value of the colour scale by a maximum of 20, preferably by a maximum of 15, more preferably by a maximum of 10 and especially by a maximum of 5 units after a 1000 h test according to SAE J 2527.

Preferably, the amount of nitrogen in the polyisocyanurate plastic matrix of the finished composite polyisocyanurate material is at least 9% by weight, more preferably at least 13% by weight and most preferably 15% by weight, based on the total weight of the polyisocyanurate plastic matrix in the composite polyisocyanurate material. The amount of nitrogen can be determined in the finished polyisocyanurate plastic by means of elemental analysis, for example by use of a varix EL cube instrument from elementar Americas INC.

In embodiments in which metal salts are used as catalyst, the proportion by weight of the metal or of the metal ions in the composite polyisocyanurate material is at least 0.00025% by weight, more preferably at least 0.001% by weight and most preferably at least 0.01% by weight, based on the polyisocyanate composition A). The proportion by weight of metal ions in the finished polyisocyanurate material can be determined by atomic absorption spectroscopy or atomic emission spectroscopy. Preferably, in such embodiments, the proportion by weight of potassium and sodium ions, especially potassium ions, in the composite polyisocyanurate material is 0.00025% to 3% by weight, preferably from 0.001% to 1% by weight and more preferably from 0.01% to 0.5% by weight, based on the composite polyisocyanurate material.

In embodiments in which metal salts are used as catalyst, the proportion by weight of the metal or of the metal ions in the polyisocyanurate plastic or in the polyisocyanurate composition A is at least 0.0008% by weight, more preferably at least 0.003% by weight and most preferably at least 0.03% by weight, based on the polyisocyanate composition A). The proportion by weight of metal ions in the finished polyisocyanurate material can be determined by atomic absorption spectroscopy or atomic emission spectroscopy. Preferably, in such embodiments, the proportion by weight of potassium and sodium ions, especially potassium ions, in the composite polyisocyanurate material is 0.0008% to 3% by weight, preferably from 0.003% to 1% by weight and more preferably from 0.03% to 0.5% by weight, based on the polyisocyanurate composition A).

The process according to the invention makes it possible, in a simple manner, to efficiently produce weathering-resistant blister-free composite polyisocyanurate materials through suitable selection of starting polyisocyanates at high temperatures and with short reaction times.

As compared with composite polyisocyanurate materials which have been produced by processes from the prior art, the process products according to the invention feature different chemical and physical properties. The different physical properties compared to composite polyisocyanurate materials of the prior art (for example density, colour number) could be attributable to a different novel network structure in the composite polyisocyanurate material as a result of the process regime according to the invention. The different chemical properties compared to composite polyisocyanurate materials of the prior art (minimum concentration of metal ions and/or minimum concentration of nitrogen in the polyisocyanurate matrix) may be attributed to the presence of the alkali metal salt or alkaline earth metal salt catalyst in the product, or to the isocyanurate group content in the finished polyisocyanurate material.

Compared to polyisocyanurate plastics which have been produced by standard processes, the process products according to the invention are notable in that the problem-free production of solid large-volume products is permitted without extreme local overheating, which typically leads to inhomogeneity and side reactions, and hence to discolouration and blisters, proceeding from oligomeric polyisocyanates in short and efficient processes that are advantageous in terms of occupational hygiene.

The invention further provides for the use of the composite polyisocyanurate material for production of components, and components comprising the composite polyisocyanurate material according to the invention.

Where "components" are discussed here, this especially means structural components, for example profiles, carriers, reinforcing struts and reinforced lightweight components, for example sports articles (arrows, bows, skis, rackets etc.), duct covers, plates, housings, leaf springs, tailgates or bonnets, shock absorbers, visors, aprons, and also pipes, pressure vessels and tanks.

The components produced with the composite polyisocyanurate material do not require any extra painting step for many applications. Bright colours such as white or yellow can be obtained directly by addition of pigments to the reactive solution without discolouration; the high UV stability and weathering resistance of the components makes protective painting unnecessary, for example in the case of outdoor applications. This saves costs. Moreover, there is no need for repair work necessitated by external effects in the event of damage to and flaking of such a protective layer, in order firstly to prevent the associated unaesthetic appearance and secondly weathering attack on the substrate. This additionally saves costs in the life cycle of the component and contributes to the environmental sustainability of the use of such components.

The invention will now be more particularly elucidated by means of examples.

GENERAL DETAILS

All percentages, unless stated otherwise, are based on percent by weight (% by weight).

The ambient temperature of 25° C. at the time of conduct of the experiments is referred to as RT (room temperature).

The NCO functionality of the various raw materials was in each case determined by calculation or taken from the respective datasheet for the raw material.

Test Methods

The methods detailed hereinafter for determining the relevant parameters were employed for performing/evaluating the examples and are also the methods for determining the parameters relevant in accordance with the invention in general.

Determination of Yellowing by Means of Cie-Lab Measurement

After crosslinking and cooling, the composite material was removed from the mould and the measurement was conducted on the lower, smooth face of the material. For this purpose, a color-guide sphere spin colorimeter from BYK-Gardner GmbH with CIE L*a*b system scale, d/8° measurement geometry and D65/10° illuminant/observer was used. The value used corresponds to the arithmetic mean of 5 measurements.

Determination of Tg by Means of DSC

The glass transition temperature $T_g$ was determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values stated below are based in each case on the evaluation of the 1st heating curve since in the investigated reactive systems, changes in the sample are possible in the measuring process at high temperatures as a result of the thermal stress in the DSC. The glass transition temperature $T_g$ determined was the temperature at half the height of a glass transition step.

Determination of Shore Hardnesses

Shore hardnesses were measured to DIN 53505 with the aid of a Zwick 3100 Shore hardness tester (from Zwick, Germany) at 23° C. and 50% air humidity.

Determination of Weathering Resistance

The weathering tests were conducted in a Ci5000 from Atlas Material Testing Technology. The samples were placed into the instrument with the smooth side facing the xenon lamp and the cycles were run in accordance with the standard SAE J 2527. At particular intervals, visual examinations were conducted for cracks, surface gloss and smoothness, appearance and change in colour. For comparison, a second sample was produced as well in each case, but was not weathered and instead kept in the dark at room temperature and 40% to 70% relative humidity and utilized as reference.

Determination of Pot Life

The viscosity of a small amount of the reactive resin material including the added catalyst was measured at 23° C. with a Physica MCR 51 from Anton Paar (plate/plate; shear rate 1 s$^{-1}$). The pot life was the time taken for the viscosity of the sample to double.

Experimental Determination of the Nitrogen Content of the Polymer Matrix in the Finished Composite Polyisocyanurate Material A few milligrams of the polymer matrix were cautiously scraped away from the composite polyisocyanurate material. A portion of this is burnt under an air atmosphere in TGA (1000° C.), and the noncombustible solids content (fibre, inorganic fillers) is determined as the residue. Then the nitrogen content is determined with a further portion of the sample in a vario EL Cube from elementar Americas INC. The difference is determined to calculate the nitrogen content in the matrix.

Theoretical Determination of the Nitrogen Content of the Polymer Matrix in the Finished Composite Polyisocyanurate Material The nitrogen content is ascertained as the sum total of all nitrogen atoms present in the polymer matrix from organic materials, i.e. from isocyanate groups, organic additives with amino groups, aromatic heterocycles with nitrogen functionalities etc., divided by the total amount of organic compounds and multiplied by 100%.

Feedstocks

Desmodur N 3600 is an HDI trimer (NCO functionality >3) with an NCO content of 23.0% by weight from Covestro AG. The viscosity is about 1200 mPas at 23° C. (DIN EN ISO 3219/A.3).

Desmodur H is an HDI monomer (NCO functionality 2) with an NCO content of 49.7% by weight from Covestro AG. The viscosity is about 3 mPas at 23° C. (DIN EN ISO 3219/A.3).

Desmodur ECO N 7300 is a PDI timer (NCO functionality >3) with an NCO content of 21.5% by weight from Covestro AG. The viscosity is about 9500 mPas at 23° C. (DIN EN ISO 32191A.3).

Desmodur I is an IPDI monomer (NCO functionality 2) with an NCO content of 37.5% by weight from Covestro AG. The viscosity is about 10 mPas at 23° C. (DIN EN ISO 3219/A.3).

Desmodur W is an H12MDI monomer (NCO functionality 2) with an NCO content of 31.8% by weight from Covestro AG. The viscosity is about 30 mPas at 23° C. (DIN EN ISO 3219/A.3).

Polyethylene glycol 400 was sourced with a purity of >99% by weight from ACROS.

Triethylene glycol was sourced with a purity of >99% by weight from ACROS.

Potassium acetate was sourced with a purity of >99% by weight from ACROS.

The short glass fibres designated 910A-10P were supplied by Owens Corning and were in the form of bundles of about 4.5 mm in length. The diameter of the individual fibres was 0.01 mm.

All raw materials except for the catalyst were degassed under reduced pressure prior to use, and the polyols were additionally dried.

Preparation of the Catalyst

Potassium acetate (5.0 g) was stirred in the PEG 400 (95.0 g) at RT until all of it had dissolved. In this way, a 5% by weight solution of potassium acetate in PEG 400 was obtained and was used as catalyst without further treatment.

Production of the Polyisocyanurate Composites

Unless stated otherwise, the polyisocyanurate composites were produced by first preparing the isocyanate composition by mixing the appropriate isocyanate components at 25° C. in a Speedmixer DAC 150.1 FVZ from Hauschild at 2750 min$^{-1}$ for 60-300 seconds. This was then mixed with the catalyst at RT (Speedmixer). Subsequently, one tenth of the amount of glass fibres was added at first. The overall mixture was mixed in a Speedmixer DAC 150.1 FVZ from Hauschild at 2750 min$^{-1}$ for 60 to 300 seconds, in the course of which the short glass fibre bundles are exfoliated and the whole mixture forms a slurry-like mass. Then the remaining amount of glass fibres is added and the mixture is mixed again in the Speedmixer at 2750 min$^{-1}$ for about 60 seconds.

Subsequently, the mixture was transferred to a mould (metal lid, about 6 cm in diameter and about 1 cm in height) and cured in an oven. This was done using the following heating programme: 30 min at 180° C. in the presence of Desmodur I or W; otherwise 30 min at 160° C.

Inventive Examples for the Production of the Composite Polyisocyanurate Materials Inventive Example As described above, Desmodur N 3600 (40.0 g) was mixed with catalyst (0.80 g), the short glass fibres (20.0 g) were incorporated and the mixture was pushed into the mould. After curing, the block was removed from the mould and the smooth reverse side was analysed with the colorimeter. The b value measured was 6.71. The pot life was more than 5 hours. In the weathering test, after 1000 hours, no changes in the surface or colour were noted on visual inspection.

Inventive Example 2

As described above, a mixture of Desmodur N 3600 (36.0 g) and Desmodur H (4.0 g) was mixed with catalyst (0.80 g), the short glass fibres (30.0 g) were incorporated and the mixture was pushed into the mould. After curing, the block was removed from the mould and the smooth reverse side was analysed with the colorimeter. The b value measured was 6.39.

Inventive Example 3

As described above, a mixture of Desmodur N 3600 (36.0 g) and Desmodur H (4.0 g) was mixed with catalyst (0.80 g), the short glass fibres (20.0 g) were incorporated and the mixture was pushed into the mould. After curing, the block was removed from the mould and the smooth reverse side was analysed with the colorimeter. The b value measured was 6.77. The pot life was more than 5 hours. In the weathering test, after 1000 hours, no changes in the surface or colour were noted on visual inspection. The Tg was 117° C.

Inventive Example 4

As described above, Desmodur N 3600 (40.0 g) was mixed with catalyst (0.80 g), the short glass fibres (30.0 g) were incorporated and the mixture was pushed into the mould. After curing, the block was removed from the mould and the smooth reverse side was analysed with the colorimeter. The b value measured was 6.40. The pot life was more than 5 hours.

Inventive Example 5

As described above, a mixture of Desmodur N 3600 (30.0 g) and Desmodur ECO N 7300 (10.0 g) was mixed with catalyst (0.80 g), the short glass fibres (20.0 g) were incorporated and the mixture was pushed into the mould. After curing, the block was removed from the mould and the smooth reverse side was analysed with the colorimeter. The b value measured was 7.89. The pot life was more than 5 hours. In the weathering test, after 1000 hours, no changes in the surface or colour were noted on visual inspection.

Inventive Example 6

As described above, a mixture of Desmodur N 3600 (20.0 g) and Desmodur ECO N 7300 (20.0 g) was mixed with catalyst (0.80 g), the short glass fibres (20.0 g) were incorporated and the mixture was pushed into the mould. After curing, the block was removed from the mould and the smooth reverse side was analysed with the colorimeter. The b value measured was 7.60. The pot life was more than 5 hours. The Tg was 124° C.

Inventive Example 7

As described above, a mixture of Desmodur H (5.0 g) and Desmodur ECO N 7300 (45.0 g) was mixed with catalyst (1.00 g), the short glass fibres (25.0 g) were incorporated and the mixture was pushed into the mould. After curing, the block was removed from the mould and the smooth reverse side was analysed with the colorimeter. The b value measured was 7.4. The pot life was more than 180 minutes. In the weathering test, after 9000 hours, no changes in the surface or colour were noted on visual inspection.

Inventive Example 8

As described above, a mixture of Desmodur N 3600 (32.0 g) and Desmodur W (8.0 g) was mixed with catalyst (0.80 g), the short glass fibres (40.0 g) were incorporated and the mixture was pushed into the mould. After curing, the block was removed from the mould and the smooth reverse side was analysed with the colorimeter. The b value measured was less than 7.

Inventive Example 9

As described above, a mixture of Desmodur N 3600 (32.0 g) and Desmodur I (8.0 g) was mixed with catalyst (0.80 g), the short glass fibres (40.0 g) were incorporated and the mixture was pushed into the mould. After curing, the block was removed from the mould and the smooth reverse side was analysed with the colorimeter. The b value measured was less than 7.

Non-Inventive Examples for the Production of the Composite Polyisocyanurate Materials Comparative Example As described above, a mixture of Desmodur N 3600 (36.0 g) and Desmodur H (4.0 g) was mixed with catalyst (0.012 g), the short glass fibres (20.0 g) were incorporated and the mixture was pushed into the mould. The mixture was placed in the oven at 160° C. for 30 minutes. After this time, the mixture was still tacky and not hard, i.e. the crosslinking reaction was incomplete. The material was not subjected to further analysis.

Comparative Example 1 shows that the catalyst concentration below or equal to an amount of 0.03% by weight is insufficient to obtain a fully crosslinked polyisocyanurate plastic within a short time.

Comparative Example 2

As described above, a mixture of Desmodur N 3600 (30.0 g) and Desmodur H (10.0 g) was mixed with catalyst (0.80 g), the short glass fibres (20.0 g) were incorporated and the mixture was pushed into the mould. After curing, the block was removed from the mould and the smooth reverse side was analysed with the colorimeter. The b value measured was 8.27. The pot life was more than 5 hours.

Comparative Example 2 shows that, in the case of a monomer content exceeding 20% by weight, there is a distinct rise in the b value measured, meaning that the visual appearance of the component deteriorates and there is onset of unwanted side reactions.

Non-Inventive Examples for Polyisocyanurate Materials Without Fibrous Filler

Unless stated otherwise, the fibre-free polyisocyanurate materials were produced by first preparing the polyisocyanate composition by mixing the appropriate isocyanate components at 25° C. in a Speedmixer DAC 150.1 FVZ from Hauschild at 2750 min$^{-1}$ for 60-300 seconds. This was mixed with the catalyst at room temperature (RT) (Speedmixer). Subsequently, the mixture was transferred to a mould (metal lid, about 6 cm in diameter and about 1 cm in height) and cured in an oven. This was done using the following heating programme: 30 min at 180° C. in the presence of Desmodur I or W; otherwise 30 min at 160° C.

Comparative Example 3

As described above, a mixture of Desmodur N 3600 (36.0 g) and Desmodur H (4.0 g) was mixed with catalyst (0.80 g) and the mixture was poured into the mould. After curing, the block was removed from the mould and the smooth reverse side was analysed with the colorimeter. The b* value measured was 9.16.

Comparative Example 4

As described above, a mixture of Desmodur N 3600 (30.0 g) and Desmodur H (10.0 g) was mixed with catalyst (0.80 g) and the mixture was poured into the mould. After curing, the block was removed from the mould and the smooth reverse side was analysed with the colorimeter. The b* value measured was 9.44.

Comparative Example 5

As described above, a mixture of Desmodur N 3600 (30.0 g) and Desmodur ECO N 7300 (10.0 g) was mixed with catalyst (0.80 g) and the mixture was poured into the mould. After curing, the block was removed from the mould and the smooth reverse side was analysed with the colorimeter. The b* value measured was 9.80. The pot life was more than 180 minutes.

Comparative Example 6

As described above, a mixture of Desmodur N 3600 (20.0 g) and Desmodur ECO N 7300 (20.0 g) was mixed with catalyst (0.80 g) and the mixture was poured into the mould. After curing, the block was removed from the mould and the smooth reverse side was analysed with the colorimeter. The b* value measured was 11.72. The pot life was more than 180 minutes.

Comparative Example 7

As described above, Desmodur H (20.0 g) was mixed with catalyst (0.80 g) and the mixture was poured into the mould. When heated, the reaction proceeded in a violent and highly exothermic manner with formation of smoke. The product obtained was a blistered, brown to dark brown porous material that was not subjected to further analysis.

Comparative Example 8

As described above, a mixture of Desmodur N 3600 (30.0 g) and Desmodur W (10.0 g) was mixed with catalyst (0.80 g) and the mixture was poured into the mould. After curing, the block was removed from the mould and the smooth reverse side was analysed with the colorimeter. The b* value measured was 13.3.

Comparative Example 9

As described above, a mixture of Desmodur N 3600 (30.0 g) and Desmodur I (10.0 g) was mixed with catalyst (0.80 g) and the mixture was poured into the mould. After curing, the block was removed from the mould and the smooth reverse side was analysed with the colorimeter. The b* value measured was 19.

The experiments show that the composite polyisocyanurate materials according to the invention from Inventive Examples 1 to 7 have distinctly lower yellowing (a lower yellow value or b value) compared to the fibre-free polyisocyanurate materials. This means that the fully reacted polyisocyanurate matrix material of the composite polyisocyanurate materials according to the invention, under the severe reaction conditions is subject to much less damage compared to the fibre-free polyisocyanurate material or no damage. Moreover, the reactive resin mixtures with the catalyst concentrations used here exhibited pot lives of more than 30 min with simultaneously rapid crosslinking times, which very closely approximates to a one-component system and enables very easy practical handling. It is therefore possible to dispense with inconvenient and costly metering apparatus as necessary in the case of two-component systems. This should pave the way for the efficient utilization of pure, fibre-reinforced composite polyisocyanurate materials in industry.

The invention claimed is:
1. A process for producing a composite polyisocyanurate material, comprising the following steps:
   a) providing a polyisocyanate composition A) consisting of one or more oligomeric polyisocyanates and not more than 0.5% by weight of one or more unconverted monomeric diisocyanates, based on the weight of the polyisocyanate composition A), and b) catalytically trimerizing the polyisocyanate composition A) in the presence of at least one fibrous filler B) and of a trimerization catalyst C) to give the composite polyisocyanurate material, wherein the trimerization catalyst C) comprises at least one of a metal salt and a quaternary ammonium salt and an optional polyether; and the trimerization catalyst C) is provided in an amount of from 0.4% to 15.0% by weight based on the weight of the polyisocyanate composition A);

wherein each of the one or more oligomeric polyisocyanates is prepared by: reacting an excess of monomeric diisocyanate, yielding the oligomeric polyisocyanate and the unconverted monomeric diisocyanate, and removing at least a portion of the unconverted monomeric diisocyanate; and wherein at least 70 wt % of the one or more oligomeric polyisocyanates are oligomeric aliphatic polyisocyanates and/or oligomeric alicyclic polyisocyanates.

2. The process according to claim 1, wherein at least 80%, 85%, 90%, 95%, 98% or 99% by weight of the one or more oligomeric polyisocyanates are oligomeric aliphatic polyisocyanates and/or oligomeric alicyclic polyisocyanates.

3. The process according to claim 1, wherein the polyisocyanate composition A) has a mean NCO functionality of 1.0 to 6.0.

4. The process according to claim 1, wherein at least 50 mol %, based on the sum total of the oligomeric polyisocyanates in the polyisocyanate composition A), have a structure selected from the group consisting of uretdione, urethane, isocyanurate, allophanate, biuret, iminooxadiazinedione and oxadiazinetrione.

5. The process according to claim 1, wherein 100 mol %, based on the sum of the oligomeric polyisocyanates in the polyisocyanate composition A), have a structure selected from the group consisting of uretdione, allophanate, biuret, iminooxadiazinedione and oxadiazinetrione.

6. The process according to claim 1, wherein the fibrous filler B) is selected from the group consisting of glass fibres, basalt fibres, carbon fibres and mixtures thereof.

7. The process according to claim 1, wherein the fibrous filler B) is glass fibres.

8. The process according to claim 1, wherein the trimerization catalyst C) comprises an alkali metal salt or alkaline earth metal salt of a carboxylic acid.

9. The process according to claim 1, wherein the trimerization catalyst C) comprises potassium acetate.

10. The process according to claim 1, wherein the trimerization catalyst C) further comprises a polyethylene glycol as the polyether.

11. The process according to claim 1, wherein the catalytic trimerization is conducted at a temperature of greater than 150° C. within less than 10 minutes, at least up to a conversion level at which only at most 20% of isocyanate groups originally present in the polyisocyanate composition A) are still present.

12. The process according to claim 11, wherein the conversion level is a conversion level at which only at most 10% of the isocyanate groups originally present in the polyisocyanate composition A) are present.

13. A composite polyisocyanurate material obtained by a process according to claim 1.

14. The composite polyisocyanurate material according to claim 13, wherein the amount of nitrogen in the composite polyisocyanurate material is at least 9% by weight, based on the total weight of the polyisocyanurate plastic matrix in the composite polyisocyanurate material.

15. The composite polyisocyanurate material according to claim 13, wherein the proportion by weight of metal or metal ions in the composite polyisocyanurate material is at least 0.00025% by weight, based on the polyisocyanate composition A).

16. The composite polyisocyanurate material according to claim 13, wherein the composite polyisocyanurate material has a density of greater than 1.30 g/cm$^3$ determined according to DIN EN ISO 1183-1.

17. Components consisting of or comprising a composite polyisocyanurate material according to claim 13.

* * * * *